United States Patent [19]

Risse

[11] Patent Number: 4,801,657

[45] Date of Patent: Jan. 31, 1989

[54] PROCESS FOR PRODUCING POLYARYLETHERS BY FORMING AN ALKYLATED INTERMEDIATE

[75] Inventor: Wilhelm K. Risse, Siegen, Fed. Rep. of Germany

[73] Assignee: E. I. Du Pont de Nemours and Company, Wilmington, Del.

[21] Appl. No.: 33,257

[22] Filed: Apr. 2, 1987

[51] Int. Cl.$^4$ ............... C08G 10/00; C08G 75/23; C08G 65/38

[52] U.S. Cl. .................................. 525/471; 525/534; 525/535

[58] Field of Search ................ 525/471, 534

[56] References Cited

U.S. PATENT DOCUMENTS

| | | | |
|---|---|---|---|
| 3,441,538 | 4/1969 | Marks | 528/86 |
| 3,770,669 | 11/1973 | Reske et al. | 521/77 |
| 4,010,147 | 3/1977 | Rose | 528/175 |
| 4,108,837 | 8/1978 | Johnson et al. | 528/126 |
| 4,320,224 | 3/1982 | Rose et al. | 528/235 |
| 4,487,978 | 12/1984 | Kruse et al. | 568/730 |

FOREIGN PATENT DOCUMENTS 0148633 7/1975 European Pat. Off.

OTHER PUBLICATIONS

Johnson, et al., J. Polymer Sci. Part A-1, 5 (1967), 2375–2398.

Walton, "Protective Groups in Organic Chemistry", Ch. 1, pp. 23–25, J. F. W. McOmie (ed.), Plenum Press, New York, 1973.

Olah, et al., Synthesis, 1986, pp. 513–531.

Mohanty, et al., 31st Int'l SAMPE Symposium, Apr. 7–10, 1986 Preprints pp. 945–955.

Primary Examiner—Harold D. Anderson
Assistant Examiner—Frederick Krass

[57] ABSTRACT

Two step process for preparing high molecular weight, high melting polyarylethers by polycondensing an alkyl-substituted dihydric phenol and an aromatic dihalide, and thereafter dealkylating the polycondensation product.

24 Claims, No Drawings

PROCESS FOR PRODUCING POLYARYLETHERS BY FORMING AN ALKYLATED INTERMEDIATE

BACKGROUND OF THE INVENTION

1. Field of the Invention

This invention relates to alkyl-substituted polyarylethers and to their use in an improved method of making high molecular weight polyarylethers.

2. Background

Polyarylethers comprise a class of organic polymers having etheric oxygen valently connecting aromatic nuclei or residua of aromatic compounds. As the term is used herein, a polyarylether consists of three or more aryl ether repeat units, —Ar—O—, wherein Ar may be a mono- or polynuclear aromatic compound. Many polyarylethers are characterized by high use temperatures, thermal and photochemical stability and resistance to attack by a variety of solvents. These desirable properties are due in part to the crystalline nature of the polymers and to their high melt temperatures. Unfortunately, the highly crystalline nature of many of the polyarylethers also make them difficult to prepare at the high molecular weights necessary for toughness. This problem is especially acute for polyarylether ketones containing repeat units I and II:

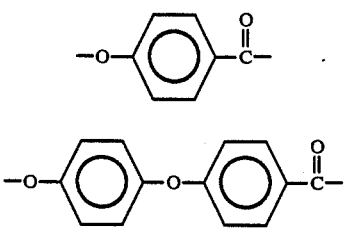

A number of methods, including nucleophilic aromatic displacement polycondensations and Friedel-Crafts polycondensations, have been developed for the synthesis of polyarylethers, polyarylether ketones and related polymers.

Johnson, et al., U.S. Pat. No. 4,108,837, disclose polyarylene polyethers which are linear thermoplastic reaction products of an alkali metal double salt of a dihydric phenol and a dihalobenzenoid compound.

Johnson, et al., J. Polymer Sci. Part A-1, 5 (1967), 2375-2398, disclose a crystalline polyarylether ketone-containing repeat unit II (supra) and having a melt temperature $T_m$ of 350° C. No direct evidence is presented concerning the molecular weight of this polymer, but it is stated that the crystallizable polyethers tend to be brittle (unstretched) unless obtained in the amorphous form. This brittleness may result from the polymer having a low molecular weight.

Rose, U.S. Pat. No. 4,010,147, discloses the use of certain diaryl sulphones as solvents in the preparation of high molecular weight polyarylether ketones by the reaction, at 250° to 400° C., of a dialkali metal salt of a bisphenol which contains ketone linking groups and a dihalobenzenoid compound having halogen atoms activated by a ketone or sulphone linking group.

Rose, et al., U.S. Pat. No. 4,320,224, disclose a tough crystalline thermoplastic aromatic polyether ketone containing the repeat unit II (supra), alone or in conjunction with other repeat units, said polymer having an inherent viscosity of at least 0.7. The process disclosed for preparing these high molecular weight polymers involves the use of elevated reaction temperatures and high boiling solvents.

Marks, U.S. Pat. No. 3,441,538, discloses preparations of very high molecular weight polyarylether ketones having repeat unit I (supra) and polyarylether sulfones, using a mixed $BF_3/HF$ catalyst and, for example, p-phenoxybenzoyl chloride or p-phenoxybenzene sulfonyl chloride Friedel-Crafts ($BF_3/HF$-catalyzed) reactions to prepare other polyarylether ketones are also disclosed. Dahl, U.S. Pat. No. 3,953,400, discloses a modified $BF_3/HF$ process employing end-capping reagents to control the inherent viscosity at 0.8-1.65.

Kelsey, EPO No. 148,633, discloses a modified nucleophilic aromatic displacement polycondensation process for preparing high molecular weight crystalline polyarylether ketones by first forming a high molecular weight amorphous polyketal ketone under mild conditions, and then converting the polyketal ketone to crystalline polyarylether ketone by acidic hydrolysis. It is not possible, however, to form a polymer with repeat unit II (supra) by this method.

Walton, "Protective Groups in Organic Chemistry", Ch. 1, pp 23-25, J. F. W. McOmie (ed.), Plenum Press, New York, 1973, reviews the use of t-butyl and i-propyl substituents as protective groups in organic synthesis, and methods for their removal from aromatic rings. Transalkylation procedures using benzene/$AlCl_3$, m-xylene/HF or p-toluenesulfonic acid/$CO_2$ are said to be fairly specific for t-butyl transfer. Chlorobenzene/$AlCl_3$ will remove the i-propyl group from o-isopropylphenol.

Kruse, et al., U.S. Pat. No. 4,487,978, disclose the use of strong Lewis acids (sulfonic acids) and alkylbenzenes at 100° -200° C. to dealkylate bisphenols substituted with $C_{4-8}$ t-alkyl groups wherein the quaternary carbon atom of the t-alkyl group is directly attached to the aromatic ring.

Olah, et al., Synthesis, 1986, pp 513-531, especially p 518, disclose the use of Nafion ®-H to dealkylate 2,6-di-t-butyl-p-cresol to o-cresol at about 60° C. Nafion ®-H is the acidic form of a solid, superacidic, perfluorinated resin-sulfonic acid catalyst film or powder (available from Aldrich Chemical Company, Inc.). It is noted that toluene is a better acceptor than benzene.

Neither Kruse, et al. nor Olah, et al. suggest the use of strong acid catalysts to remove alkyl groups from alkyl-substituted polymers.

Reske, et al., U.S. Pat. No. 3,770,669 and 3,792,148, disclose a process for making shaped articles from polyamides which are high-melting or sparingly soluble or exhibit both properties, which process comprises molding N-alkyl substituted polyamides from the melt or from solution and then thermally splitting off the substitutents as unsaturated hydrocarbons. Particularly preferred substitutents are n-propyl, i-propyl, i-butyl and t-butyl groups.

Mohanty, et al., 31st International SAMPE Symposium, Apr. 7-10, 1986 Preprints, pp 945-955, disclose the synthesis of an amorphous high molecular weight copolymer from hydroquinone, t-butyl hydroquinone and 4,4,-difluorobenzophenone. The copolymer is subsequently partially dealkylated with aluminum trichloride in chlorobenzene to yield a semicrystalline material. No method is disclosed for the complete dealkylation of the copolymer.

European Patent Application Publication No. 0,157,732 discloses a copolymer having repeat units of the formulas

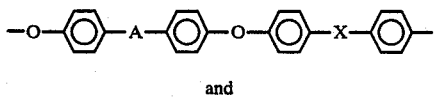

and

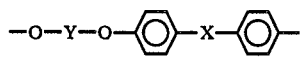

wherein
X is a diradical which includes —$SO_2$— and —CO—,
Y is an aryl diradical which includes

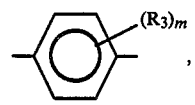

$R_3$ is halogen, $C_{1-4}$ alkyl, or $C_{1-4}$ alkoxy, and
m is 0 or 1 to 4.

Deckers, DE No. 3,342,433, discloses the use of mixtures of carbonates of Li and/or alkaline earths with carbonates of Na, K, Rb, and/or Cs in the preparation of aromatic polyethers by nucleophilic polycondensation. For example, a mixture of $CaCO_3$ (10.0 g) and $K_2CO_3$ (1.4 g) was used in the reaction of 4,4'-difluorobenzophenone (21.8 g), hydroquinone (11.0 g), 4-chlorodiphenyl sulfone (0.10 g), diphenyl sulfone to give a polyether with relative viscosity 4.42 dL/g. In contrast, a polyether with relative viscosity 1.64 dL/g was obtained when $K_2CO_3$ (15.1 g) was the only carbonate used.

DETAILED DESCRIPTION OF THE INVENTION

This invention provides a process for synthesizing polyarylethers, either crystalline or amorphous, preferably crystalline, of high molecular weight and high melting point, under mild conditions, by first forming a high molecular weight, amorphous, alkyl-substituted polyaryl-ether, and then removing the alkyl substituents by contacting the polymer with a Lewis acid or a strong protic acid. Preferred polyarylethers herein include polyarylether ketones and polyarylether sulfones.

By "high molecular weight polyarylether" and "high molecular weight alkyl-substituted polyarylether" are meant such polyethers having an inherent viscosity of greater than 0.5 dL/gram as measured in a suitable solvent, for example, chloro form or tetrachloroethane (TCE) for the alkylated polymer, or sulfuric acid for the dealkylated polymer. By "high melting" is meant having a Tm of greater than 300° C.

More specifically the invention resides in a two-step process comprising:

A. contacting and reacting, at a temperature of 100° to 300°, in an inert, aprotic polar solvent having a boiling point greater than the reaction temperature, under substantially anhydrous conditions, in the presence of ≧2 to <10 equivalents of an alkali metal and/or alkaline earth metal carbonate and/or bicarbonate, substantially equimolar amounts of:
  (i) at least one alkyl-substituted dihydric phenol; and
  (ii) an aromatic dihalide having at least one, inert, halogen-activating, electron-withdrawing group in the positions ortho and para to the halogen atoms on the aromatic ring,
to produce amorphous, high molecular weight alkylated polyarylether; and B. contacting and reacting, under an inert atmosphere, alkylated polyarylether from step A and a suitable Lewis acid or a protic acid having an acidity function ($H_o$) of less than −11, to produce dealkylated, high molecular weight, high melting polyarylether.

The high molecular weight, amorphous, alkyl-substituted polyarylether is made by polycondensing, under substantially anhydrous conditions, at least one dihydric phenol which is, or is at least admixed with, an alkyl-substituted dihydric phenol and at least one aromatic dihalide in which the halogen atoms are activated by having an inert electron-withdrawing group in one or more of the positions ortho or para to the halogen atoms, in the presence of at least one alkali or alkaline earth metal carbonate or bicarbonate, at an elevated temperature.

The term "dihydric phenol" is intended to include dihydroxy-substituted mononuclear and dihydroxy-substituted dinuclear compounds. Thus, suitable dihydric phenols include, but are not intended to be limited to, mononuclear compounds, such as hydroquinone and resorcinol, and dinuclear compounds, such as 4,4'-dihydroxybiphenyl, 4,4'-dihydroxybenzophenone, 2,2-bis(4-hydroxyphenyl)-propane, bis(4-hydroxyphenyl)methane, 2,2-bis(4-hydroxyphenyl)-1,1,1,3,3,3-hexafluoropropane, 4,4'-dihydroxydiphenyl sulfide, 4,4'-dihydroxydiphenyl sulfone, 1,4-bis(4'-hydroxyphenoxy)benzene, 1,2-bis(4-hydroxyphenyl)ethane, bis(4-hydroxyphenyl)-ether, 3,3,3',3'-tetramethylspirobis-1,1'-indane-6,6'-diol and 3,3,3',3',5,5',7,7'-octamethylspirobis-1,1'-indane-6,6-diol. Suitable alkyl-substituted dihydric phenols include, but are not intended to be limited to, mono- or dinuclear dihydric phenols, as described above, which are substituted with one or more $C_{3-8}$ iso-alkyl or $C_{4-8}$ tertiary-alkyl groups. Mixtures of dihydric phenols can be used, provided that at least 25 mol % of the dihydric phenols are substituted with at least one $C_{3-8}$ iso-alkyl or $C_{4-8}$ tertiary alkyl group. Preferably, the dihydric phenol is an alkyl-substituted hydroquinone. Most preferably, the dihydric phenol is t-butylhydroquinone or 2,5-di-t-butylhydroquinone.

An aromatic dihalide, as the term is used herein, is a dihalobenzenoid compound which has two halogen atoms bonded to a benzene ring(s) having an inert electron-withdrawing (activating) group in at least one of the positions ortho and para to the halogen atoms. The aromatic dihalide can be either mononuclear, wherein the halogen atoms are attached to the same benzenoid ring, or polynuclear, that is, dinuclear, wherein they are attached to different benzenoid rings. If the two halogen atoms are attached to different benzenoid rings, each ring must have such an inert electron-withdrawing (activing) group. Preferred aromatic dihalides include 2,4-dichloro-nitrobenzene, 2,4-difluorobenzophenone, 2,4-dichlorodiphenyl sulfone, 2,4-difluoronitrobenzene, 4,4'-dichlorodiphenyl sulfoxide, 1,4-bis(4'-chlorobenzoyl)-benzene, 4,4'-dichlorodiphenyl sulfone, 4,4'-difluorodiphenyl sulfone and 4,4'-difluorobenzophenone. Most preferably, the aromatic dihalide is 4,4'-difluorobenzophenone, 4,4,-dichlorodiphenyl sulfone or 4,4'-difluorodiphenyl sulfone.

Because the reaction between the dihydric phenol and the aromatic dihalide proceeds on an equimolar basis and because the desirable properties of the polyarylethers are secured, at least in part, as a result of the high molecular weights achieved, substantially equal molar amounts of these two reactants are preferred. However, an excess of up to 5% of one reactant can be tolerated without a serious reduction in the molecular weights of the polymers.

Suitable alkali and alkaline earth metal carbonates and bicarbonates include, but are not intended to be limited to, potassium carbonate, potassium carbonate admixed with sodium carbonate, sodium bicarbonate, rubidium carbonate, cesium carbonate or calcium carbonate. Anhydrous potassium carbonate and anhydrous potassium carbonate admixed with up to 95 mol % of anhydrous calcium carbonate are preferred. The total amount of alkali and/or alkaline earth metal carbonate and/or bicarbonate employed should be such that, for each mole of dihydric phenol, there are at least two equivalents, but less than ten equivalents, of carbonate and/or bicarbonate. Each mole of alkali metal bicarbonate is considered to be one equivalent; each mole of alkali metal or alkaline earth metal carbonate is considered to be two equivalents. The amount of carbonate and/or bicarbonate used in excess of two equivalents is not critical as long as the amount is less than ten equivalents Moderate excesses (2.5 –6 equivalents) of anhydrous potassium carbonate have been found to be useful as a dehydrating agent in the reaction to form the alkyl-substituted polyarylether.

The polycondensation of dihydric phenol and aromatic dihalide is conducted in the presence of an inert, aprotic polar solvent whose boiling point is above the temperature at which the polycondensation is conducted. Preferred solvents include organic sulfoxides and sulfones. Particularly preferred are dimethylsulfoxide (DMSO), dimethylsulfone, diethyl sulfoxide, diethylsulfone, tetrahydrothiophene and diphenyl-sulfone. The most preferred solvents are dimethyl-sulfoxide and diphenylsulfone.

Because the presence of more than 0.5%, by weight, of water in the reaction mixture leads to the formation of low molecular weight polymer, it is essential to maintain substantially anhydrous conditions, that is, no more than 0.5 wt.% water, preferably less than 0.5 wt.%, throughout the polycondensation reaction. This can be accomplished by using freshly dried and distilled solvents and by continuously removing the water formed during the reaction of the dihydric phenol and the aromatic dihalide in the presence of the alkali and/or alkaline earth metal carbonate and/or bicarbonate. A convenient way to remove the water is by the distillation of a water-containing azeotrope from the reaction mixture. Benzene, toluene, xylene, halogenated benzenes or other inert (that is, does not participate in the polycondensation reaction) azeotrope-forming organic liquids can be employed. The distillation temperature of the azeotrope should be below the temperature at which polycondensation is carried out. The amount of azeotrope-forming liquid is not critical, but if it is not a cosolvent for the polymer (polycondensation product), it should be substantially removed before initiating polymerization. Toluene, chlorobenzene and o-dichlorobenzene are preferred azeotrope-forming liquids. Other techniques which will remove substantially all of the water can also be used, for example, the use of an excess of anhydrous alkali or alkaline earth metal carbonate.

The alkyl-substituted polyarylether polymers are readily synthesized under mild conditions. Typically, substantially equimolar amounts of purified alkyl-substituted dihydric phenol and aromatic dihalide, together with a slight excess of anhydrous bicarbonate and/or carbonate salt, an azeotrope-forming liquid and an inert, aprotic polar solvent, are placed in a reaction vessel equipped with a stirrer, a Dean Stark trap and/or distillation head and a means for maintaining an inert atmosphere. The vessel is purged with inert gas to remove oxygen. The vessel is then heated to a moderate temperature (below the condensation reaction temperature) to remove as an azeotrope any water which may be present. The remaining azeotrope-forming liquid should then be removed by distillation if its boiling point is substantially below the temperature at which polycondensation is carried out, or if it is a nonsolvent (that is, not a cosolvent) for the polycondensation product. The reaction mixture is then heated sufficiently to cause polycondensation (polymerization). The temperature at which polycondensation occurs will depend on the dihydric phenol and dihalide chosen The polycondensation is carried out at a temperature of 100° to 300° C. Below 100° C., the reaction rate is too slow to be practical. Temperatures above 200° C. may be required when less than 50 mol% of the dihydric phenol is alkyl substituted The preferred temperature range is 150° to 250° C.

The time necessary to complete the polycondensation is also variable, but about 30 minutes to 48 hours will usually be suitable, with 1 to 24 hours being preferred in most cases. When the polycondensation is complete, the reaction mixture (cooled slightly or still hot) is poured into a non-solvent (usually an alcohol or water) for the alkyl-substituted polyarlyether polymer. The solid polymeric product is filtered off and washed well to remove high-boiling solvents and residual salts. Further purification can be achieved by dissolving the polymer in an organic solvent, filtering the resultant solution and reprecipitating the polymer.

The alkyl-substituted polyarylethers produced in the polycondensation reaction mixture are high molecular weight, amorphous polymers which possess many of the desirable features of the corresponding unsubstituted polyarylethers. The alkyl-substituted polyarylethers possess the additional advantage that they can be more easily processed by conventional solvent- or melt-processing techniques to form films, fibers or shaped articles In general, however, the alkyl-substituted polymers are not as solvent resistant or as dimensionally stable at high temperatures as the unsubstituted polymers.

Partial to complete removal of the alkyl substituent from the alkyl-substituted polyarylether is accomplished by contacting the alkyl-substituted polyarylether with a Lewis acid or a strong protic (proton) acid, that is, an acid with an acidity function ($H_o$) $< -11$. Combinations of proton acids and Lewis acids, for example, $HF/BF_3$ and $HF/SbF_5$, can also be used. The definition and a detailed discussion of $H_o$ can be found in Olah, et al., "Superacids", John Wiley and Sons, New York, 1985. Suitable Lewis acids include aluminum trihalides, for example, aluminum trichloride and aluminum tribromide; boron trifluoride etherate; and zinc dihalides, for example, zinc dibromide. A preferred Lewis acid is aluminum trichloride. Suitable protic acids include perchloric, halosulfuric and perfluoroalkane sulfonic acids, and the acid form of perfluorosulfonic acid resins, such as Nafion ®-H. A preferred protic acid is trifluoromethanesulfonic acid (triflic acid). Fuming sulfuric acid usually will not be used, although it meets the above definition of a protic acid, because it results in sulfonation of the polymer.

The amount of acid is not critical. The dealkylation mixture is stirred at room temperature or slightly above (up to about 50° C.) for 1-48 hours, preferably 12-24 hours. The reaction mixture is then poured into a suitable nonsolvent (for example, water when the acid is triflic acid, or an alcohol when the acid is a Lewis acid, such as aluminum trichloride) and the precipitated polymer is washed well to remove the acid.

When the acid-catalyzed dealkylation of the alkyl-substituted polyarylether is conducted in the presence of a transalkylation acceptor, such as toluene or benzene, the products are the dealkylated polyarylether and an alkyl-substituted acceptor. In the absence of an acceptor, the alkyl substituent is removed substantially as an unsaturated hydrocarbon. For example, t-butyl groups are removed as i-butylene in the absence of an acceptor.

The alkylated polyarylether which is produced in the polycondensation reaction may be isolated from the polycondensation reaction mixture before it is subjected to dealkylation. Alternatively, particularly if the alkylated polyarylether is soluble in the solvent used in the polycondensation reaction, the polycondensation reaction mixture, preferably after removal of the inorganic salts, for example, by filtration, may be used directly in the dealkylation step of the process of the invention.

The amount of dealkylation varies with the dealkylation system (for example, depending on whether the dealkylation is carried out with a strong acid, a Lewis acid, and whether it is carried out with or without an alkyl acceptor), and it probably varies with the specific alkyl group of the alkyl-substituted polymer Strong acids, for example, triflic acid , are most effective if complete dealkylation is desired. Lewis acids alone, or combinations of a Lewis acid and an alkyl acceptor, may be useful if complete dealkylation is not desired. The extent of dealkylation can be determined by 1H or 13C NMR analysis, for example, by comparing the relative ratios of alkyl and aromatic nuclei of the alkyl-substituted polyarylether before and after dealkylation.

The alkyl-substituted polymer can be dealkylated by filtering the poly-condensation reaction mixture to remove excess carbonate and/or bicarbonate and then adding a suitable acid. In such a procedure, the preferred solvent is diphenylsulfone and the preferred acid is triflic acid or Nafion®-H.

When dealkylation is accomplished by using a solid acid catalyst with $H_o < -11$, for example, Nafion®-H, separation of the dealkylated polymer from the Nafion®-H resin can be achieved by first filtering, to remove the solvent, and then dissolving the polymer, for example, in methanesulfonic acid, filtering to remove the solid acid catalyst, and reprecipitating the polymer from the acid solution.

The process of this invention provides a simplified means of producing polyarylethers of high molecular weight. For example, the polycondensation can be carried out at a relatively low temperature in readily available, relatively inexpensive, easily removable solvents, without the formation of a ketal structure as disclosed in the art. The dealkylation step, likewise, can be carried out easily, either before or after the polymer is fabricated into a shaped structure.

All of the starting materials used in carrying out the invention are either known compounds or can be prepared readily by means of known chemical reactions.

The following examples are intended to illustrate the invention and are not to be construed as a limitation on the invention as described in greater detail throughout this specification. It is to be understood that one skilled in the art will readily envision additional examples which illustrate various embodiments of the invention. Examples 1-8 demonstrate the formation of the alkylated polyarylether, and Examples 9-17 demonstrate the removal of some or all of the alkyl groups with a Lewis or protic acid. In the examples temperatures are given in degrees Celsius. The t-butylhydroquinone and 2,5-di-t-butylhydroquinone were recrystallized from toluene before use; and the 4,4'-difluorobenzophenone was recrystallized from n-hexane/ethanol (60/40) before use. Reagent grade dimethylsulfoxide (DMSO) and toluene were distilled before use; Aldrich Gold Label® DMSO was used as received from the vendor.

EXAMPLE 1

A 3-necked 100 ml flask equipped with a stopper, a distillation head and thermometer, a $N_2$ inlet, and a 2-necked flask for the distillate was charged with 40 mL of DMSO, 830 mg of t-butylhydroquinone, 1.09 g of 4,4'-difluorobenzophenone, 15 mL of toluene, 2.07 g of anhydrous potassium carbonate and a magnetic stir bar. The reaction mixture was heated in a 170° oil bath for 3 h. During this time a water/toluene azeotrope was distilled off and the reaction mixture turned brown. The reaction mixture was cooled to about 50° and poured into 400 mL of methanol to precipitate the alkylated polymer. The polymer was washed successively with methanol and water and then dried. The polymer was redissolved in chloroform to give a cloudy solution which was filtered through a fine filter and poured into 400 mL of methanol to reprecipitate the polymer. The polymer was dried at 50° under a vacuum for 24 h. Yield 1.4 g (81%).

The polymer was characterized by 1H-NMR 1.4 (s, 9H); 6.9-7.3 (m, 7H); 7.8 (d, 4H). A MW of 64,300 was determined by gel permeation chromatography (GPC), using polystyrene as a standard. The inherent viscosity of the polymer measured in chloroform was 0.59 dL/g. DSC (differential scanning calorimetry) shows $T_g = 177°$.

EXAMPLE 2

A 3-necked 250 mL flask equipped with a mechanical stirrer, a Dean Stark trap, a condenser and two adapters for argon -inlet and -outlet was charged under argon with 888 mg of 2,5-di-t-butylhydroquinone, 872 mg of 4,4'-difluorobenzophenone, 2.17 g of anhydrous potassium carbonate, 30 mL of DMSO and 10 mL of toluene. The reaction mixture was heated for 2 h to an oil bath temperature of 170° . A precipitate formed after 30 min of heating at 17° The reaction mixture was cooled for 5 min and then poured into 300 mL of methanol to precipitate the polymer product. The polymer was isolated by filtration and washed successively with methanol and water. The polymer was dried, redissolved in dichloromethane and the resulting solution was filtered through a fine filter to remove residual inorganic salts. The filtered solution was poured into 200 mL of methanol to reprecipitate the polymer, which was then dried overnight in a vacuum oven at 50° . Yield: 800 mg (50%).

EXAMPLE 3

A 3-necked 500 mL flask equipped as described in Example 2 was flushed with argon for 10 min and then charged with 4.98 g of t-butylhydroquinone, 6.54 g of 4,4'-difluorobenzophenone, 150 mL of DMSO and 30 mL of toluene. Argon was passed over this mixture for 15 min at room temperature. Anhydrous potassium carbonate (12.42 g) was added, causing the reaction mixture to turn slightly yellow. The reaction mixture darkened to brown as it was heated in an oil bath. When the bath temperature reached 170°, the argon flow was adjusted so that toluene distilled off at a rate of 0.2 mL/min. The reaction mixture was heated for 3 h in a 170° oil bath and then allowed to cool for 10 min. The reaction mixture (still hot) was poured into 700 mL of methanol to precipitate the white polymer. The polymer was washed with water (2×200 mL), methanol (200 mL) and dried at 0.2 torr, 50° for 24 h. Yield: 9.39 g (91%). DSC of the polymer showed no Tm (melt transition) below 360°. The inherent viscosity of the polymer measured in chloroform was 1.495 dL/g.

EXAMPLE 4

The procedure described in Example 3 was repeated. Yield: 9.25 g (90%). Inherent viscosity: 0.899 dL/g.

EXAMPLE 5

The procedure described in Example 3 was repeated using a 250 mL 3-necked flask, 830 mg of t-butylhydroquinone, 1.09 g of 4,4'-difluorobenzophenone, 30 mL of DMSO, 10 mL of toluene and 2.17 g of anhydrous potassium carbonate. The partially cooled reaction mixture was poured into 300 mL of methanol to precipitate the polymer. The polymer was isolated by filtration, washed with methanol and water and dried. The polymer was dissolved in 30 mL of chloroform to give a cloudy solution which was filtered through a fine filter and poured into 300 mL of methanol to reprecipitate the polymer. The polymer was filtered off and dried at 60° under a vacuum. Yield: 1.51 g (88%).

EXAMPLE 6

The procedure described in Example 3 was repeated using a 500 mL 3-necked flask, 16.6 g of t-butylhydroquinone, 21.8 g of 4,4'-difluorobenzophenone, 300 mL of DMSO, 50 mL of toluene and 41.4 g of anhydrous potassium carbonate. The washed and dried polymer was extracted with hot water, redissolved in chloroform, and the resulting solution was filtered and poured into methanol to reprecipitate the polymer. Yield: 31.3 g (91%). The inherent viscosity measured in chloroform was 1.323 dL/g.

EXAMPLE 7

A 250 mL 3-necked flask equipped as descrieed in Example 3 was flushed with argon for 15 min and charged with 830 mg of t-butylhydroquinone, 550 mg of hydroquinone, 2.18 g of 4,4'-difluorobenzophenone, 40 mL of DMS, 10 mL of toluene and 4.26 g of anhydrous potassium carbonate. The reaction mixture was heated in an oil bath (190°) for 3 h; the final temperature of the reaction mixture was 170°. A toluene/water azeotrope was distilled off. The reaction mixture was cooled for 10 min and poured into 300 mL of methanol to precipitate the polymer. The polymer was filtered, washed with methanol and water and dried at 50°, 0.2 torr for 24 h. The polymer was redissolved in 50 mL of 1,1,2,2-tetrachloroethane (TCE). The resulting solution was filtered to remove the inorganic by-products and poured into 250 mL of methanol. The reprecipitated polymer was filtered, washed with methanol and dried at 50°, 0.2 torr for 24 h. Yield: 2.92 g (92%). The inherent viscosity measured in TCE was 0.635 dL/g. Analysis of the IH-NMR spectrum of the mixed hydroquinone polymer showed an average of 0.53 t-butyl group per repeat unit.

EXAMPLE 8

The procedure described in Example 7 was repeated using 3.32 g of t-butylhydroquinone (20 mmol) and 5.74 g of 4,4'-dichlorodiphenyl sulfone (used as obtained from Aldrich Chemical Company, 98% purity), 80 mL of DMSO, 20 mL of toluene and 8.23 g of anhydrous potassium carbonate. The reaction was heated in a 170° oil bath for 3 h. The resulting polymer was precipitated with methanol, isolated and redissolved in chloroform. The resulting polymer solution was filtered and reprecipitated in methanol. Yield: 6.5 g (86%). The inherent viscosity measured in chloroform was 0.339 dL/g.

EXAMPLE 9

A mixture of 0.3 g of t-butyl-substituted polyether ketone from Example 3 and 20 mL of triflic acid was stirred under $N_2$ at room temperature until the polymer dissolved completely (30 min). During this time, isobutylene evolved. The homogeneous reaction mixture was poured into 100 mL of water to precipitate the polymer product. The polymer was washed with water and methanol and dried at 50°, 0.2 torr for 24 h. Yield: 0.25 g (99%). 1H NMR ($CH_3SO_3H$): 7.2 (mult., 2, aromatic); 8.0 (mult., 1, aromatic). No resonances were observed at 1.0–1.5 ppm, confirming the removal of the t-butyl substitutents

EXAMPLE 10

A 0.5 g sample of the polymer prepared in Example 3 was dissolved in 20 mL of toluene in a 100 mL flask equipped with a sidearm and a magnetic stir bar. Aluminum trichloride (213 mg) was added under $N_2$. A gummy precipitate formed after about 20 min. The mixture was stirred at room temperature for 24 h. The precipitate and solution were dark yellow. The mixture was poured into 100 mL of methanol to halt the reaction. The polymer was filtered, washed with methanol and water and dried at 50°, 0.2 torr for 24 h. Yield: 0.47 g. Analysis of the IH-NMR spectrum of the polymer in $CH_3SO_3H$ showed that approximately 16% of the t-butyl groups had been removed from the t-butyl-substituted polyether ketone as prepared in Example 3.

EXAMPLE 11

The procedure described in Example 10 was repeated using 794 mg of aluminum trichloride. Yield: 0.43 g. Analysis of the product in $CH_3SO_3H$ showed that approximately 65% of the t-butyl groups had been removed.

EXAMPLE 12

The procedure described in Example 10 was repeated using 823.7 g of boron trifluoride etherate as the Lewis acid. The resulting polymer was completely soluble in methylene chloride. Yield: 0.49 g.

EXAMPLE 13

The procedure described in Example 10 was repeated using 1.32 g of $ZnBr_2$ as the Lewis acid. Yield: 0.48 g. Analysis of the product in $CH_3SO_3H$ showed that approximately 8% of the t-butyl groups had been removed.

EXAMPLE 14

The procedure described in Example 9 was repeated using 300 mg of t-butyl-substituted polyether ketone, prepared similarly to that of Example 3, and 10 mL of triflic acid. The solution of polymer and acid was stirred for 2 weeks. The reaction mixture was poured into 200 mL of water to precipitate the polymer. The polymer was further purified according to the procedure described in Example 9. Yield: 250 mg (99%). The polymer was still mostly white, with a slightly brownish tint. The inherent viscosity measured in sulfuric acid was 1.23 dL/g, indicating that even prolonged treatment of the polyether ketone with triflic acid does not result in chain scission.

EXAMPLE 15

A 100 mL flask equipped with a magnetic stir bar and connected to a $N_2$ line via a bubbler was charged with 400 mg of polymer prepared as in Example 7 and 6 mL of triflic acid. The polymer dissolved after being stirred at room temperature for 3 h under $N_2$. After 12 h the reaction mixture was poured into 50 mL of distilled water to precipitate the polymer. The polymer was filtered, washed with water, then methanol, and dried at 50°, 0.2 torr for 24 h. Yield: 370 mg. The inherent viscosity measured in $H_2SO_4$ (99.7%) was 1.328 dL/g. Tg=155.5° (by DSC); Tm=305.5° (by DSC). Analysis of the 1H-NMR spectrum of the polymer in $D_2SO_4$ indicated complete removal of the t-butyl groups.

EXAMPLE 16

The procedure described in Example 15 was repeated using 60 mg of polymer prepared as in Example 2 and 5 mL of triflic acid. The mixture was stirred at room temperature under $N_2$ for 24 h and then poured into 50 mL of water to precipitate the product. The polymer was filtered, washed with methanol and dried at 50°, 0.2 torr for 24 h. Yield: 42 mg (92%). T(cryst.)=162.4° (by DSC); Tm=312.6° (by DSC).

EXAMPLE ∫p A 100 mL flask equipped with a nitrogen inlet and a syringe port was flushed with nitrogen and charged with 15 mL of toluene and 1.291 g of polymer prepared as in Example 8. After the polymer had dissolved, 9 mL of triflic acid was added by syringe and the resulting mixture was stirred at 25° for 24 h. The triflic acid phase was isolated and poured into 100 mL of water. The yellow polymer which precipitated was washed with methanol and then with water. Yield: 1.02 g (93%). Analysis of the 1H-NMR spectrum of the polymer in $D_2SO_4$ showed that at least 90% of the t-butyl groups had been removed.

I claim:

1. Two-step process for preparing a high molecular weight, high melting polyarylether, the process comprising:
    A. contacting and reacting, at a temperature of 100° to 300° C., in an inert, aprotic polar solvent having a boiling point greater than the reaction temperature, under substantially anhydrous conditions, in the presence of $\geq 2$ to $<10$ equivalents of an alkali metal and/or alkaline earth metal carbonate and/or bicarbonate, substantially equimolar amounts of:
        (i) at least one alkyl-substituted dihydric phenol wherein the alkyl substituent is $C_{3-8}$ iso-alkyl or $C_{4-8}$ tertiary alkyl; and
        (ii) an aromatic dihalide having at least one, inert, halogen-activating, electron-withdrawing group in the positions ortho and para to the halogen atoms on the aromatic ring,
    to produce amorphous, high molecular weight alkylated polyarylether; and
    B. contacting and reacting, under an inert atmosphere, alkylated polyarylether from step A and a suitable Lewis acid or a protic acid having an acidity function ($H_o$) of less than $-11$, to produce dealkylated, high molecular weight, high melting polyarylether.

2. Process of claim 1 wherein the polyarylether is a polyarylether ketone.

3. Process of claim 1 wherein the polyarylether is a polyarylether sulfone.

4. Process of claim 1 wherein the alkylsubstituted dihydric phenol of step A(i) is admixed with up to 75 mol % of non-alkyl-substituted dihydric phenol, and the alkylated polyarylether produced in step A and used in step B is admixed with up to 75 mol % of non-alkylated polyarylether.

5. Process of claim 1 wherein step A is carried out at 150° to 250° C. for about 30 minutes to 48 hours, and step B is carried out at room temperature to about 50° C. for 1 to 48 hours.

6. Process of claim 5 wherein step A is carried out for 1 to 24 hours, and step B is carried out for 12 to 24 hours.

7. Process of claim 1 wherein step B is carried out in the presence of a transalkylation alkyl acceptor.

8. Process of claim 7 wherein the alkyl acceptor is benzene or toluene.

9. Process of claim 1 wherein step B is carried out with a suitable Lewis acid.

10. Process of claim 9 wherein the Lewis acid is selected from aluminum trihalides and zinc dihalides.

11. Process of claim 9 wherein the Lewis acid is selected from aluminum trichloride, zinc bromide and boron trifluoride etherate.

12. Process of claim 1 wherein step B is carried out with a protic acid.

13. Process of claim 12 wherein the protic acid is selected from perchloric, halosulfuric and perfluoroalkane sulfonic acids and the acid form of perfluorosulfonic acid resins.

14. Process of claim 12 wherein the protic acid is trifluoromethanesulfonic acid.

15. Process of claim 12 wherein the protic acid is the acid form of a perfluorosulfonic acid resin.

16. Process of claim 1 wherein the alkyl-substituted dihydric phenol is t-butylhydroquinone and the aromatic dihalide is 4,4'-difluorobenzophenone.

17. Process of claim 1 wherein the alkyl-substituted dihydric phenol is 2,5-di-t-butylhydroquinone and the aromatic dihalide is 4,4',-difluorobenzophenone.

18. Process of claim 1 wherein the polar solvent in step A is dimethylsulfoxide.

19. Process of claim 1 wherein the polar solvent in step A is diphenylsulfone.

20. Process of claim 1 wherein step A is carried out in the presence of an alkali metal carbonate.

21. Process of claim 20 wherein the alkali metal carbonate is potassium carbonate.

22. Process of claim 1 wherein step A is carried out in the presence of an inert azeotropeforming liquid which forms an azeotrope having a boiling point below the reaction temperature.

23. Process of claim 22 wherein the inert azeotrope-forming liquid is selected from benzene, toluene, the xylenes and halogenated benzenes.

24. Process of claim 23 wherein the inert azeotrope-forming liquid is toluene.

* * * * *